(12) United States Patent
Frey et al.

(10) Patent No.: US 8,519,205 B2
(45) Date of Patent: Aug. 27, 2013

(54) LOW WATER BIOMASS-DERIVED PYROLYSIS OILS AND PROCESSES FOR PRODUCING THE SAME

(75) Inventors: Stanley J. Frey, Palatine, IL (US); Douglas A. Clarke, Richmond (CA)

(73) Assignee: Ensyn Renewables, Inc., Wilmington, DE (US)

( * ) Notice: Subject to any disclaimer, the term of this patent is extended or adjusted under 35 U.S.C. 154(b) by 270 days.

(21) Appl. No.: 12/842,394

(22) Filed: Jul. 23, 2010

(65) Prior Publication Data

US 2012/0022171 A1 Jan. 26, 2012

(51) Int. Cl.
*C10G 1/00* (2006.01)

(52) U.S. Cl.
USPC ............... 585/240; 585/242; 44/307; 44/605; 44/607

(58) Field of Classification Search
None
See application file for complete search history.

(56) References Cited

U.S. PATENT DOCUMENTS

| | | |
|---|---|---|
| 4,344,770 A | 8/1982 | Capener et al. |
| 4,891,459 A | 1/1990 | Knight et al. |
| 5,605,551 A * | 2/1997 | Scott et al. ............ 44/307 |
| 8,043,391 B2 | 10/2011 | Dinjus et al. |
| 2009/0293344 A1 | 12/2009 | O'Brien et al. |

FOREIGN PATENT DOCUMENTS

| | | |
|---|---|---|
| WO | 2009047387 A1 | 4/2009 |
| WO | 2009047392 A1 | 4/2009 |

OTHER PUBLICATIONS

Wang, X., et al., The influence of microwave drying on biomass pyrolysis, Energy and Fuels, v 22, n 1, p. 67-74, Jan./Feb. 2008.
Cornelissen, T., et al., Flash co-pyrolysis of biomass with polylactic acid. Part 1: Influence on bio-oil yield and heating value, Fuel, v 87, n 7, p. 1031-1041, Jun. 2008.
Westerhof, R., et al., Controlling the water content of biomass fast pyrolysis oil, Industrial and Engineering Chemistry Research, v 46, n 26, p. 9238-9247, Dec. 19, 2007.

\* cited by examiner

*Primary Examiner* — Yate K Cutliff
(74) *Attorney, Agent, or Firm* — Jones Day

(57) ABSTRACT

Low water-containing biomass-derived pyrolysis oils and processes for producing them are provided. The process includes condensing pyrolysis gases including condensable pyrolysis gases and non-condensable gases to separate the condensable pyrolysis gases from the non-condensable gases, the non-condensable gases having a water content, drying the non-condensable pyrolysis gases to reduce the water content of the-non-condensable gases to form reduced-water non-condensable pyrolysis gases, and providing the reduced-water non-condensable pyrolysis gases to a pyrolysis reactor for forming the biomass-derived pyrolysis oil.

16 Claims, 2 Drawing Sheets

LOW WATER BIOMASS-DERIVED PYROLYSIS OILS AND PROCESSES FOR PRODUCING THE SAME

FIELD OF THE INVENTION

The present invention generally relates to biofuels, and more particularly relates to low water biomass-derived pyrolysis oils and processes for producing the same.

DESCRIPTION OF RELATED ART

Biomass-derived pyrolysis oil may be employed as fuel for a variety of applications. For example, biomass-derived pyrolysis oil can serve as fuel for certain boiler and furnace applications. In other instances, the biomass-derived pyrolysis oil can be provided as a potential feedstock in catalytic processes for the production of fuel in petroleum refineries. Recently, the use of biomass-derived pyrolysis oil as a transportation fuel has been investigated, which could reduce consumer dependency on conventional petroleum and reduce environmental impact.

To form biomass-derived pyrolysis oil, processes such as rapid pyrolysis are commonly used. Generally during rapid pyrolysis, organic biomass materials, such as wood waste, agricultural waste, etc., are rapidly heated in a process reactor in the absence of air to temperatures in a range of about 450° C. to about 600° C. to yield organic vapors, water vapor, pyrolysis gases, and ash (char). The organic and water vapors are condensed to form biomass-derived pyrolysis oil.

Although conventional pyrolysis processes produce useful forms of the biomass-derived pyrolysis oil, the processes may be improved. For example, though the biomass is typically subjected to drying to remove more than 90% of its water content prior to being provided to the pyrolysis reactor, conventionally-produced biomass-derived pyrolysis oils still may yield complex, highly oxygenated organic liquids containing about 20-30% by weight of water. The high water content of the conventionally-produced biomass-derived pyrolysis oil can, over time, cause phase separation, and can reduce the energy density of the pyrolysis oil. Additionally, drying the biomass before pyrolysis consumes large amounts of energy.

Accordingly, it is desirable to provide processes for producing low water biomass-derived pyrolysis oil that may be performed by consuming less energy than conventional pyrolysis processes. Additionally, it is desirable to produce low water biomass-derived pyrolysis oil having substantially increased storage stability. Furthermore, other desirable features and characteristics of the present invention will become apparent from the subsequent detailed description of the invention and the appended claims, taken in conjunction with the accompanying drawings and this background of the invention.

SUMMARY OF THE INVENTION

In an embodiment, a process for reducing water in a biomass-derived pyrolysis oil includes condensing pyrolysis gases comprising condensable pyrolysis gases and non-condensable gases to separate the condensable pyrolysis gases from the non-condensable gases, the non-condensable gases having a water content, drying the non-condensable pyrolysis gases to reduce the water content of the-non-condensable gases to form reduced-water non-condensable pyrolysis gases, and providing the reduced-water non-condensable pyrolysis gases to a pyrolysis reactor for forming the biomass-derived pyrolysis oil.

In another embodiment, a process for preparing a low water biomass-derived pyrolysis oil includes introducing pyrolysis gases into a condenser, the pyrolysis gases comprising condensable pyrolysis gases and non-condensable pyrolysis gases, the non-condensable gases having a water content. The condenser is adjusted to a predetermined temperature to provide a threshold vapor pressure of water in the condenser to thereby provide a maximum water content for retention in the biomass-derived pyrolysis oil. Pyrolysis gases are condensed in the condenser to separate the condensable pyrolysis gases from the non-condensable gases. The non-condensable pyrolysis gases are dried to reduce the water content of non-condensable pyrolysis gases to form reduced-water non-condensable pyrolysis gases. The reduced-water non-condensable pyrolysis gases are provided to a pyrolysis reactor for forming the biomass-derived pyrolysis oil.

In still another embodiment, a process for preparing a low water biomass-derived pyrolysis oil includes condensing pyrolysis gases comprising condensable pyrolysis gases and non-condensable gases to separate the condensable pyrolysis gases from the non-condensable gases, the non-condensable gases having a water content. The non-condensable pyrolysis gases are dried to reduce the water content of the-non-condensable gases to form reduced-water non-condensable pyrolysis gases. The reduced-water non-condensable pyrolysis gases are provided to a pyrolysis reactor for forming the biomass-derived pyrolysis oil. A biomass material is pyrolyzed in the pyrolysis reactor with the reduced-water non-condensable pyrolysis gases to form reduced-water pyrolysis gases. The reduced-water pyrolysis gases are condensed to form the low water biomass-derived pyrolysis oil, the low water biomass-derived pyrolysis oil having a water content in a range of about 2% to about 30%.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

An improved biomass-derived pyrolysis oil and processes for producing the improved biomass-derived pyrolysis oil are provided. The improved biomass-derived pyrolysis oil has a water content that is less than that of conventionally-produced biomass-derived pyrolysis oils. In accordance with an embodiment, the improved biomass-derived pyrolysis oil has a water content in a range of about 2% to about 30%. In another embodiment, the water content of the improved biomass-derived pyrolysis oil is lower than the aforementioned range.

Figure 1:
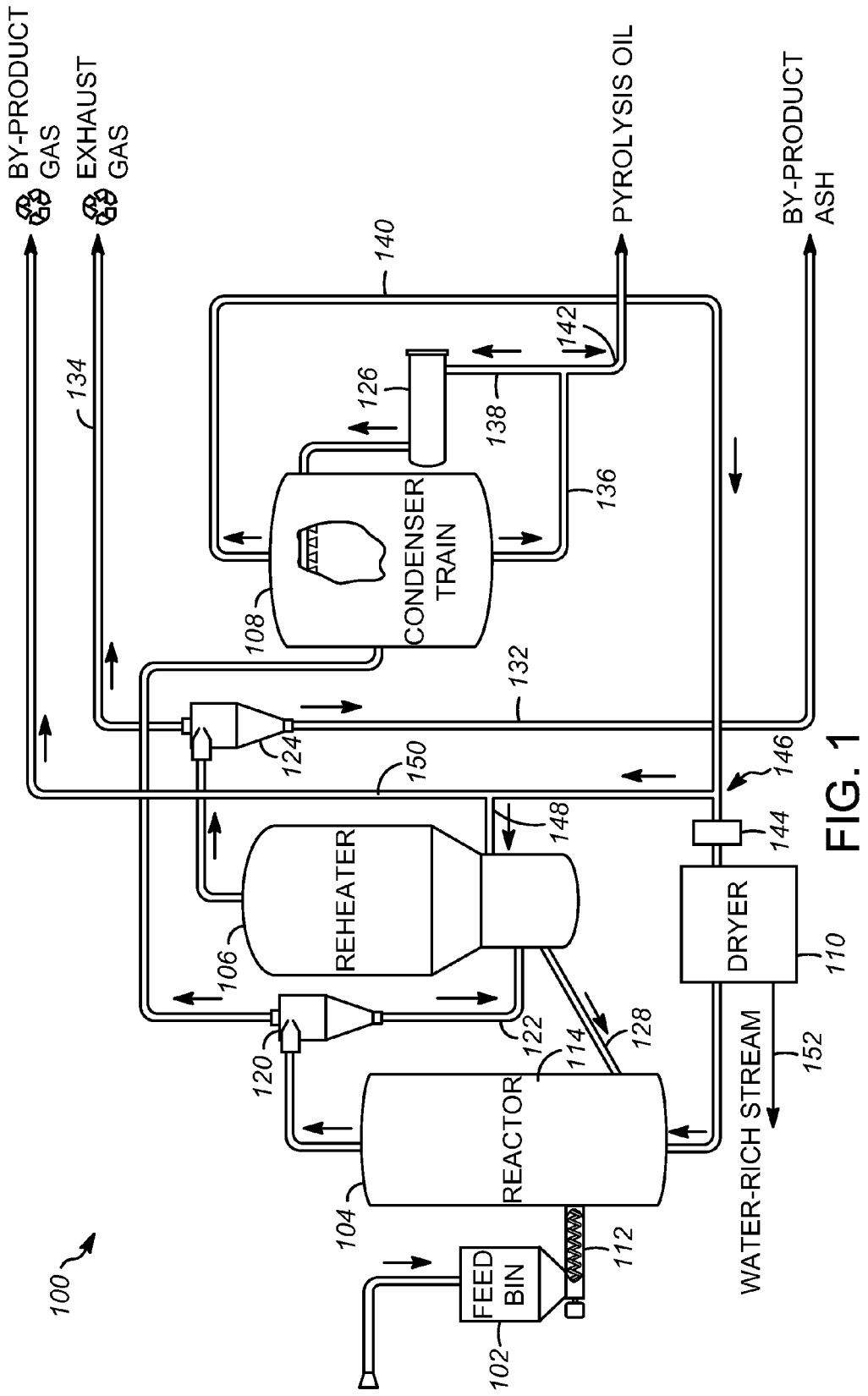
FIG. 1 is a simplified schematic of a system for producing low water biomass-derived pyrolysis oil, according to an embodiment.

FIG. 1 is a simplified schematic of a system 100 that may be employed for producing low water biomass-derived pyrolysis oil, in accordance with an embodiment. Although not depicted, the system 100 may include a number of additional or alternative components, such as blowers, pumps, storage tanks or other devices for use in forming a biomass-derived pyrolysis oil. Moreover, the components described in system 100 need not be placed in the illustrated order, and the system 100 may be incorporated into a more comprehensive system having additional functionality not described in detail herein. Furthermore, one or more of the components of system 100 may be omitted from an embodiment of the system 100 as long as the intended overall functionality of the system 100 (e.g., to form biomass-derived pyrolysis oil) remains intact.

Generally, the system 100 includes a feed bin 102, a pyrolysis reactor 104, a reheater 106, a condenser 108, and a dryer 110. The components of system 100 are in flow communication via conduits, tubes or other lines through which gas, liquids, and/or solids can flow.

The feed bin 102 is configured to receive biomass material from a feed source (not shown). The biomass material comprises a carbonaceous biomass feedstock, and includes, but is not limited to wood, agricultural wastes/residues, nuts and seeds, algae, grasses, forestry residues, municipal solid waste, construction and/or demolition debris, cellulose and lignin or the like. In accordance with an embodiment, the feed bin 102 provides the biomass material to a feed conveyor 112 in communication with the pyrolysis reactor 104. The feed conveyor 112 conveys the biomass material into the pyrolysis reactor 104.

The pyrolysis reactor 104 pyrolyzes the biomass material to produce char, vapor, and pyrolysis gases. In this regard, the pyrolysis reactor 104 comprises any one of numerous types of pyrolysis reactors suitable for pyrolyzing biomass material. Examples of suitable pyrolysis reactors include, but are not limited to fixed bed pyrolysis reactors, fluidized bed pyrolysis reactors, circulating fluidized bed reactors (CFBR), or other pyrolysis reactors capable of pyrolysis. Other pyrolysis reactors can be used in other embodiments.

The pyrolysis reactor 104 generally includes a reactor riser 114 within which a heat transfer medium (not shown) is disposed. The reactor riser 114 is generally tubular. In another embodiment, the reactor riser 114 is a box or has another shape suitable for housing the heat transfer medium. The heat transfer medium includes inert solids suitable for directly or indirectly transferring heat to the biomass material within the reactor riser 114, such as sand, catalytic materials, or a combination thereof. The heat transfer medium may be provided in a fluidized state and maintained at a temperature suitable for pyrolysis to pyrolyze the biomass material.

A first separator system 120 is in flow communication with the pyrolysis reactor 104 and is configured to separate solids from gases. For example, the first separator system 120 receives pyrolyzed materials from the pyrolysis reactor 104 and separates solids making up the heat transfer medium from pyrolysis gases included in the pyrolyzed materials. Suitable devices for inclusion in the separator system 120 include, but are not limited to, cyclonic recirculation apparatus, and the like. A line 122 provides communication between the first separator system 120 and the reheater 106, which reheats the heat transfer media collected from the first separator system 120. A conduit 128 provides a pathway from the reheater 106 to the pyrolysis reactor 104 to allow the reheated heat transfer media to return to the pyrolysis reactor 104 for use.

A second separator system 124 captures solids and gases exiting from the reheater 106. The second separator system 124 can include a cyclonic recirculation apparatus or the like.

The solids from the reheater 106, which may comprise by-product ash, are collected and removed from the system 100 via a conduit 132. Gases exiting the separator system 124 are exhausted from the system 100 through conduit 134.

The condenser 108 is disposed in communication with the pyrolysis reactor 104 and receives the pyrolysis gases from the pyrolysis reactor 104. The condenser 108 is configured to cool condensable gases causing the condensable gases to phase change into liquid. For example, the pyrolysis gases comprise a condensable portion (also referred to as "condensable pyrolysis gases") and a non-condensable portion (also referred to as "non-condensable pyrolysis gases"), and the condenser 108 cools the condensable portion of the pyrolysis gases to transform a portion of the condensable pyrolysis gases into liquid. The condenser 108 may also be configured to be adjusted to a predetermined temperature to provide a threshold vapor pressure of water in the condenser 108, such that a predetermined maximum pyrolysis water content is retained by the resulting biomass-derived pyrolysis oil. Accordingly, the non-condensable pyrolysis gases have a vaporous water content that is dependent on a vapor pressure of water in the condenser. Although depicted as being a single condenser 108 in FIG. 1, the condenser 108 can include more than one unit placed in series, in other embodiments. Suitable types of condenser include, but are not limited to surface condensers, such as heat exchange-type condensers, liquid quench condensers and the like. In other embodiments, another type of condenser may be employed.

Liquid collected by the condenser 108 is carried away via a conduit 136. A portion of the liquid flows through another conduit 138 to a cooler 126, while another portion of the liquid is diverted through conduit 142 and removed from the system 100 as the biomass-derived pyrolysis oil. In an example, the biomass-derived pyrolysis oil is directed to a storage tank (not shown). The cooler 126 cools the received portion of the liquid from the condenser 108 and redirects the liquid to the condenser 108 to be used as a coolant for the condenser 108.

Non-condensable pyrolysis gases not condensed by the condenser 108 flow from the condenser 108 into a conduit 140 to be re-used in the system 100. The non-condensable pyrolysis gases, which include hydrogen gas, methane, and carbon oxides, can be used to provide combustion energy fuel for use in various components of the system 100 or elsewhere. In an example, a portion of the non-condensable pyrolysis gases is re-directed from conduit 140 to a dryer (not shown) to dry the biomass material prior to being fed to the feed bin 102. For instance, the redirected portion of the non-condensable pyrolysis gases is diverted into conduit 150 at junction 146 and flows toward the dryer. In another example, a portion of the non-condensable pyrolysis gases is diverted from conduit 140 into conduit 148 and delivered to the reheater 106 to be burnt. Still another portion of the non-condensable pyrolysis gases is provided to the pyrolysis reactor 104 to serve as fluidizing gas in the pyrolysis reactor to mix the heat transfer medium in the reactor riser 114 (e.g., sand) with the biomass. Accordingly, the non-condensable pyrolysis gases continue along conduit 140 toward the reactor 104.

Prior to introduction into the pyrolysis reactor 104, the non-condensable pyrolysis gases are de-hydrated to remove water, because water can reduce the quality of the pyrolysis oils formed by pyrolysis. In this regard, the dryer 110 is disposed between the condenser 108 and the pyrolysis reactor 104. As used herein, the term "dryer" is defined as an apparatus capable of removing water from a gas or liquid. In an embodiment, the dryer 110 is selected for being capable of removing at least about 50% of the water content of the non-condensable pyrolysis gases. In another embodiment, the dryer 110 is selected for being capable of removing at least about 90% of the water content of the non-condensable pyrolysis gases. In still another embodiment, the dryer 110 removes less than 50% of the water content of the non-condensable pyrolysis gases.

A variety of different apparatus configured to remove the water can be employed for removing water from the non-condensable pyrolysis gases. For example, the dryer 110 can be configured to remove the water by cooling the non-condensable pyrolysis gases to a predetermined temperature at which the water liquefies, and the water is collected and diverted to a collection tank 130. In such an embodiment, the dryer 110 comprises a chiller. In another embodiment, the dryer 110 can be configured to remove molecules of water as the non-condensable gases including the water passes through the dryer 110. In such a configuration, an adsorptive drier, such as a molecular sieve can be used as the dryer 110. In an example, the molecular sieve is selected to entrap molecules in a size range of about 3 Angstroms to about 5 Angstroms. In another embodiment, the adsorptive dryer can include a pillared clay, alumina, salt or another type of molecular sieve. The water removed from the dryer 110 flows along conduit 152 out of the system 100, in an embodiment. In another embodiment, the conduit 152 is in flow communication with a storage tank or reservoir (not shown).

Figure 2:
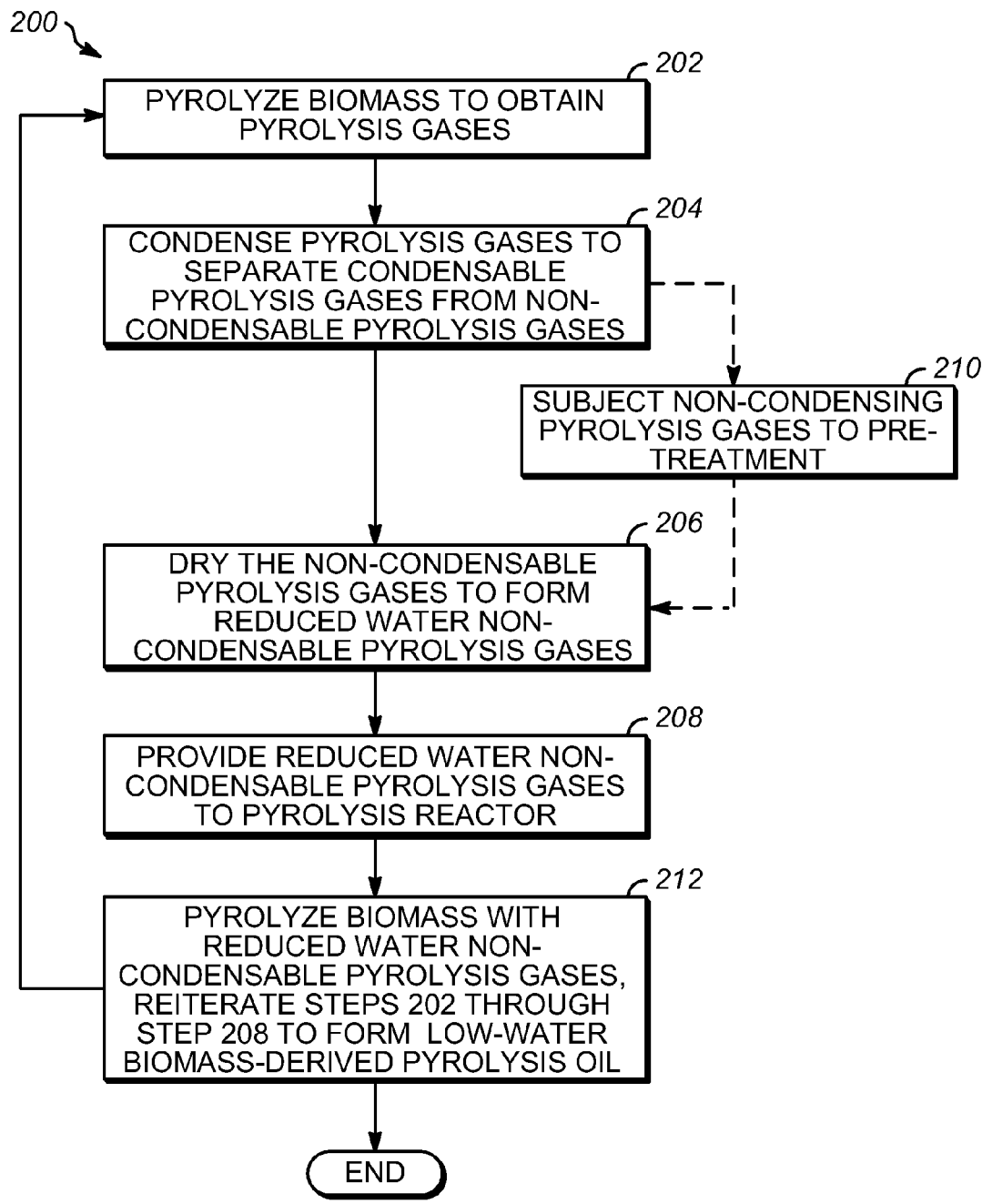
FIG. 2 is a flow diagram of a process for reducing the water content of biomass-derived pyrolysis oil to produce low water biomass-derived pyrolysis oils, according to an embodiment.

According to another embodiment, the system 100 further includes a gas pre-treatment zone 144 to prepare the reduced-water non-condensable pyrolysis gases for introduction into the dryer 110. FIG. 2 is a flow diagram of a process 200 for forming a low water biomass-derived pyrolysis oil, according to an embodiment. Process 200 represents one implementation of a method for forming the low water biomass-derived pyrolysis oil. For illustrative purposes, the following description of process 200 may refer to components mentioned above in connection with FIG. 1. In practice, portions of process 200 may be performed by different components of the described system 100, e.g., the pyrolysis reactor 104, the condenser 108, the dryer 110, etc. Additionally, process 200 may include any number of additional or alternative steps, the steps shown in FIG. 2 need not be performed in the illustrated order, and process 200 may be incorporated into a more comprehensive procedure or process producing additional products not described in detail herein. Moreover, one or more of the steps shown in FIG. 2 could be omitted from an embodiment of the process 200 as long as the overall intention, e.g., to produce a low water biomass-derived pyrolysis oil, remains intact.

Process 200 begins with pyrolyzing a biomass material to obtain pyrolysis gases, step 202. The biomass material comprises one or more of the biomass materials mentioned previously in connection with feed bin 102, in an embodiment. In another embodiment, the biomass material is another carbonaceous biomass material. The biomass material can be prepared prior to being pyrolyzed. For example, in some cases, the biomass material includes water, and water is removed from the biomass material. The biomass material may be dried such that a water content in a range of about 4% to about 20% remains. In another embodiment, the biomass material is comminuted to a particle size of about 0.5 mm to about 12 mm. The biomass material is then fed to a pyrolysis reactor (e.g., reactor 104) and pyrolyzed.

Pyrolysis includes rapidly heating the biomass material in the pyrolysis reactor at a rate of about 500° C. per second to about 50,000° C. per second in the absence of air. In other embodiments, the pyrolysis processes may be performed using processing parameters that are different than those previously mentioned. Although the aforementioned rapid pyrolysis process is described, other embodiments can employ other pyrolysis processes. For example, other types of pyrolysis processes suitable for obtaining pyrolysis gases include, but are not limited to vacuum pyrolysis, catalytic pyrolysis, and slow pyrolysis (also known as carbonization).

After the biomass feedstock has been pyrolyzed, solid char, vapors, and pyrolysis gases are formed. The solid and gas products (e.g., solid char, vapors, and pyrolysis gases) and, in some cases, a portion of a heat transfer medium from the pyrolysis reactor, exit the pyrolysis reactor. To isolate the gas products (e.g., vapors and pyrolysis gases) from the solid char and heat transfer media, the gas products, solid char, and heat transfer media are directed into a separator system (e.g., system 120). The solid char and heat transfer media are redirected to a heater (e.g., heater 106) for char combustion and reheating of the heat transfer media. For example, the heat transfer medium may be reheated by oxidation at temperatures in a range of about 400° C. to about 750° C. at slightly above ambient pressure. The heat transfer media circulation rate may be used to control the temperature of a combustion bed in the heater. Alternatively, diluted air may be used to control the rate of combustion within the reheater. The regenerated heat transfer medium and solid char may be directed to another separator system to remove the solid char from the regenerated heat transfer medium. Then, the regenerated heat transfer medium may be recycled to the pyrolysis reactor.

The pyrolysis gases are condensed to separate the condensable pyrolysis gases from the non-condensable pyrolysis gases, step 204. The pyrolysis gases are introduced into and flow through the condenser or series of condensers to cool the condensable pyrolysis gases and to cause the condensable pyrolysis gases to phase change into liquid, while the non-condensable pyrolysis gases remain in gaseous phase. In an embodiment, the condenser cools the pyrolysis gases to a temperature in a range of 10° C. to about 90° C. suitable for causing the condensable pyrolysis gases to phase change to liquid. In accordance with an embodiment, the temperature in the condenser 108 is adjusted to a higher or lower temperature to thereby control a vaporous water content of the non-condensable pyrolysis gases. For example, a temperature above 60° C. allows an amount of water that remains with the non-condensable pyrolysis gases to be lower than the amount retained in the non-condensable pyrolysis gases if the temperature of the condenser 108 was adjusted to a lower temperature. As alluded to above, the condensable pyrolysis gases condense into the biomass-derived pyrolysis oil, which can be diverted to a storage tank (not shown) or may be directed to a cooler (e.g., cooler 124) for use in the condenser during subsequent condensing processes. The non-condensable pyrolysis gases comprising hydrogen gas, methane, carbon oxides, and water, flows out of the condenser toward the reactor.

Prior to flowing back to the reactor, the non-condensable pyrolysis gases are dried to reduce a water content of the non-condensable pyrolysis gases and to form reduced-water non-condensable pyrolysis gases, step 206. In an embodiment, the non-condensable pyrolysis gases are subjected to a temperature in a range in which a portion of the water vapor changes phase to liquid, while the non-condensable pyrolysis gases remain in gaseous phase. Suitable temperatures include, but are not limited to about 0° C. to about 90° C. In another embodiment, the water in the non-condensable pyrolysis gases is adsorbed using an adsorptive dryer. Regardless of the particular drying process, the water content of the non-condensable pyrolysis gases preferably is reduced by at least about 50%. In another embodiment, the water content of the non-condensable pyrolysis gases is reduced by at least about 90%. In other embodiments, the water content is reduced by less than 50%. In any case, removing water from the non-condensable pyrolysis gases produces the reduced-water non-condensable pyrolysis gases, which are provided to the pyrolysis reactor for forming a low water biomass-derived pyrolysis oil, step 208.

In some embodiments of process 200, the reduced-water non-condensable pyrolysis gases are subjected to pre-treatment steps prior to introduction into the dryer, step 208. For instance, the reduced water non-condensable pyrolysis gases are heated in order to prevent liquids from condensing on adsorptive media disposed within the dryer. In an embodiment, suitable heating temperatures include those in a range of about 5° C. to about 150° C. above the temperature employed in step 206. In other embodiments, the reduced water non-condensable pyrolysis gases are heated to higher or lower temperatures than those in the aforementioned range. In another example, the non-condensable pyrolysis gases are filtered to reduce a mist load of the gases To form the low water biomass-derived pyrolysis oil, biomass material is pyrolyzed with the reduced-water non-condensable pyrolysis gases and the process reiterates at step 204 and continues at least through step 210. For example, after the biomass material and reduced-water non-condensable pyrolysis gases are pyrolyzed, reduced-water pyrolysis gases are produced. Specifically, the reduced-water pyrolysis gases include a water content that is lower than the water content of pyrolysis gases produced by pyrolysis without use of the reduced-water non-condensable pyrolysis gases. When the reduced-water pyrolysis gases are condensed, condensable and non-condensable pyrolysis gases are separated from each other. In particular, the condensable pyrolysis gases condense to form the low water biomass-derived pyrolysis oil.

Hence, by removing water from the non-condensable pyrolysis gases before they are employed in the pyrolysis reactor for pyrolysis, the resulting biomass-derived pyrolysis oil has lower water content than a biomass-derived pyrolysis oil formed without the use of the reduced-water non-condensable pyrolysis gases. Specifically, the biomass-derived pyrolysis oil formed by process 200 has a water content in a range of about 20% to about 30%. In embodiments in which a dried biomass material is pyrolyzed with the reduced-water non-condensable pyrolysis gases, the low water biomass-derived pyrolysis oil may have a water content in a range of about 2% to about 30%. The low water biomass-derived pyrolysis oil is a single phase liquid which exhibits improved storage stability and higher energy density over pyrolysis oils formed using conventional pyrolysis processes. The low water biomass-derived pyrolysis oil is thus more suitable for use as a biofuel than the starting biomass-derived pyrolysis oil.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for lowering water in a biomass-derived pyrolysis oil, comprising:
   i) condensing pyrolysis gases to separate condensable pyrolysis gases from water-containing non-condensable pyrolysis gases;
   ii) drying the water-containing non-condensable pyrolysis gases to reduce the water content of the water-containing non-condensable pyrolysis gases to form reduced-water non-condensable pyrolysis gases;
   iii) providing the reduced-water non-condensable pyrolysis gases to a pyrolysis reactor;
   iv) pyrolyzinq a biomass material in the pyrolysis reactor with the reduced-water non-condensable pyrolysis gases to form reduced-water pyrolysis gases; and
   v) condensing at least a portion of the reduced-water pyrolysis gases to form a low-water biomass-derived pyrolysis oil.

2. The process of claim 1, wherein the drying comprises passing the water-containing non-condensable pyrolysis gases over a chiller.

3. The process of claim 1, wherein the drying comprises passing the water-containing non-condensable pyrolysis gases through an adsorptive dryer.

4. The process of claim 3, wherein the adsorptive dryer comprises a molecular sieve.

5. The process of claim 1, wherein the condensing pyrolysis gases further comprises:
   i) introducing the pyrolysis gases into a condenser; and
   ii) adjusting the condenser to a predetermined temperature to provide a threshold vapor pressure of water in the condenser to provide a predetermined maximum water content included in the low-water biomass-derived pyrolysis oil.

6. The process of claim 1, wherein the process further comprises heating the reduced-water non-condensable pyrolysis gases.

7. The process of claim 1, wherein the process further comprises filtering the water-containing non-condensable pyrolysis gas to reduce a mist load of said water-containing non-condensable pyrolysis gas.

8. A process for preparing low-water biomass-derived pyrolysis oil, comprising:
   i) introducing pyrolysis gases into a condenser, wherein the pyrolysis gases comprise condensable pyrolysis gases and water-containing non-condensable pyrolysis gases;
   ii) adjusting the condenser to a predetermined temperature to provide a threshold vapor pressure of water in the condenser to thereby provide a maximum water content included in the low-water biomass-derived pyrolysis oil;
   iii) condensing the pyrolysis gases in the condenser to separate the condensable pyrolysis gases from the water-containing non-condensable pyrolysis gases;
   iv) drying the water-containing non-condensable pyrolysis gases to reduce the water content of water-containing non-condensable pyrolysis gases to form reduced-water non-condensable pyrolysis gases;
   v) providing the reduced-water non-condensable pyrolysis gases to a pyrolysis reactor;
   vi) pyrolyzing a biomass material in the pyrolysis reactor with the reduced-water non-condensable pyrolysis gases to form reduced-water pyrolysis gases; and
   vii) condensing at least a portion of the reduced-water pyrolysis gases to form the low-water biomass-derived pyrolysis oil.

9. The process of claim 8, wherein the drying reduces the water content of the water-containing non-condensable pyrolysis gases by at least 50%.

10. The process of claim 8, wherein the drying reduces the water content of the water-containing non-condensable pyrolysis gases by at least 90%.

11. The process of claim 8, wherein the process further comprises:
   i) drying a biomass material to form a dried biomass material;
   ii) pyrolyzing the dried biomass material in the pyrolysis reactor with the reduced-water non-condensable pyrolysis gases to form reduced-water pyrolysis gases; and
   iii) condensing the reduced-water pyrolysis gases to form the low-water biomass-derived pyrolysis oil.

12. The process of claim 11, wherein the step of pyrolyzing comprises pyrolyzing the biomass material by using a rapid pyrolysis process.

13. A process for preparing low-water biomass-derived pyrolysis oil, comprising:
   i) condensing pyrolysis gases to separate condensable pyrolysis gases from water-containing non-condensable pyrolysis gases;
   ii) drying the water-containing non-condensable pyrolysis gases to reduce the water content of the water-containing non-condensable pyrolysis gases to form reduced-water non-condensable pyrolysis gases;
   iii) providing the reduced-water non-condensable pyrolysis gases to a pyrolysis reactor;
   iv) pyrolyzing a biomass material in the pyrolysis reactor with the reduced-water non-condensable pyrolysis gases to form reduced-water pyrolysis gases; and
   v) condensing at least a portion of the reduced-water pyrolysis gases to form the low-water biomass-derived pyrolysis oil, the low-water biomass-derived pyrolysis oil having a water content in a range of about 2% to about 30%.

14. The process of claim 13, wherein the process further comprises drying the biomass material to form a dried biomass material, before the step of pyrolyzing.

15. The process of claim 13, wherein the reduced-water non-condensable pyrolysis gases are heated before being provided to the dryer.

16. The process of claim 13, wherein the water-containing non-condensable pyrolysis gases are filtered to reduce a mist load of the water-containing non-condensable pyrolysis gases, after being condensed and before drying.

* * * * *